(12) United States Patent
Park et al.

(10) Patent No.: US 9,915,759 B2
(45) Date of Patent: Mar. 13, 2018

(54) POLARIZING PLATE, LIQUID CRYSTAL DISPLAY DEVICE HAVING THE SAME AND METHOD OF FABRICATING THE POLARIZING PLATE

(71) Applicant: LG Display Co., Ltd., Seoul (KR)

(72) Inventors: HyeJeong Park, Jeollabuk-do (KR); WonKi Park, Gyeonggi-do (KR); YoonJung Eo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 102 days.

(21) Appl. No.: 14/735,316

(22) Filed: Jun. 10, 2015

(65) Prior Publication Data
US 2015/0362648 A1 Dec. 17, 2015

(30) Foreign Application Priority Data
Jun. 12, 2014 (KR) ........................ 10-2014-0071623

(51) Int. Cl.
| | |
|---|---|
| *G02F 1/1335* | (2006.01) |
| *G02B 1/11* | (2015.01) |
| *G02B 5/30* | (2006.01) |
| *G02B 1/111* | (2015.01) |
| *G02B 5/02* | (2006.01) |

(52) U.S. Cl.
CPC ............ *G02B 1/111* (2013.01); *G02B 5/0242* (2013.01); *G02B 5/0247* (2013.01); *G02B 5/3033* (2013.01); *G02F 1/133528* (2013.01)

(58) Field of Classification Search
None
See application file for complete search history.

(56) References Cited

U.S. PATENT DOCUMENTS

| | | | |
|---|---|---|---|
| 6,319,594 B1 | 11/2001 | Suzuki et al. | |
| 2005/0195486 A1* | 9/2005 | Sasaki | G02B 1/11 359/580 |
| 2006/0087865 A1* | 4/2006 | Ha | G02B 5/0242 362/607 |
| 2006/0134428 A1* | 6/2006 | Miyazaki | C09D 4/00 428/411.1 |
| 2007/0019131 A1* | 1/2007 | Choi | G02B 5/0215 349/65 |

(Continued)

FOREIGN PATENT DOCUMENTS

| | | |
|---|---|---|
| CN | 1776460 A | 5/2006 |
| CN | 102200603 A | 9/2011 |

(Continued)

OTHER PUBLICATIONS

Extended European Search Report dated Mar. 14, 2016, for corresponding European Patent Application No. 15171372.4.

(Continued)

*Primary Examiner* — Ryan Crockett
(74) *Attorney, Agent, or Firm* — Morgan, Lewis & Bockius LLP

(57) ABSTRACT

A polarizing plate, a liquid crystal display device having the polarizing plate and a method of fabricating the polarizing plate are characterized by forming an anti-glare/reflection layer, which is formed into a single layer through one coating process using a phase separation resulting from a weight difference between polymer beads and air bubbles. This may result in ensuring cost competitiveness.

15 Claims, 8 Drawing Sheets

(56) References Cited

U.S. PATENT DOCUMENTS

| | | | |
|---|---|---|---|
| 2009/0142562 A1* | 6/2009 | Miyagawa | B32B 7/02 428/212 |
| 2009/0244710 A1 | 10/2009 | Tsuno et al. | |
| 2009/0268273 A1* | 10/2009 | Powers | G02B 5/0231 359/288 |
| 2009/0296022 A1* | 12/2009 | Lee | G02B 5/305 349/64 |
| 2010/0031544 A1* | 2/2010 | Hwang | G02B 5/02 40/564 |
| 2010/0208165 A1* | 8/2010 | Kamada | G02B 6/0051 349/64 |
| 2011/0317099 A1* | 12/2011 | Fuchida | G02B 5/0242 349/64 |
| 2012/0206923 A1* | 8/2012 | Tanaka | B29C 44/0438 362/326 |
| 2013/0017769 A1 | 1/2013 | Kimura et al. | |
| 2014/0313691 A1 | 10/2014 | Kaida et al. | |
| 2015/0092276 A1* | 4/2015 | Miyake | G02B 5/0242 359/599 |

FOREIGN PATENT DOCUMENTS

| | | |
|---|---|---|
| CN | 102356334 A | 2/2012 |
| CN | 102712074 A | 10/2012 |
| JP | 2000015068 A | 1/2000 |
| WO | 2013058075 A1 | 4/2013 |

OTHER PUBLICATIONS

Partial European Search Report dated Nov. 17, 2015, for corresponding European Patent Application No. 15171372.4.

First Notification of Office Action from the State Intellectual Property Office of China dated Jan. 11, 2018 in related Chinese application No. 201510316523.1. Note JP 2000-015068 cited therein is already of record.

\* cited by examiner

POLARIZING PLATE, LIQUID CRYSTAL DISPLAY DEVICE HAVING THE SAME AND METHOD OF FABRICATING THE POLARIZING PLATE

CROSS-REFERENCE TO RELATED APPLICATION

Pursuant to 35 U.S.C. § 119(a), this application claims the benefit of earlier filing date and right of priority to Korean Application No. 10-2014-0071623, filed on Jun. 12, 2014, the contents of which is incorporated by reference herein in its entirety.

BACKGROUND OF THE DISCLOSURE

1. Field of the Disclosure

This specification relates to a polarizing plate, a liquid crystal display (LCD) device having the same, and a method of fabricating the polarizing plate, and more particularly, to a polarizing plate having an anti-glare/reflection layer, an LCD device having the same, and a method of fabricating the polarizing plate.

2. Background of the Disclosure

As the interest in information displays and demands on the use of portable information media increase, research and commercialization are focusing mainly on flat panel displays (FPDs) which are light in weight and thin in thickness. Specifically, a liquid crystal display (LCD) device among such FPDs is a device for displaying an image using optical anisotropy of liquid crystals, and is actively applied to notebook computers or desktop monitors in terms of resolution, color reproduction and image quality thereof.

The FPD includes an anti-glare layer that is located on the outermost surface thereof to reduce reflectance using the principle of optical interferometry, in order to prevent deterioration of contrast and visibility caused due to reflection of incident light entering from outside and a reception (output) of a reflected image.

Among those FPDs, an LCD device is driven by two electrodes facing each other, and a liquid crystal layer interposed between the two electrodes. Liquid crystal molecules of the liquid crystal layer are driven by an electric field which is generated by applying a voltage to the two electrodes.

The liquid crystal molecules have polarization properties and optical anisotropy. The polarization property refers to that electric charges within liquid crystal molecules are concentrated onto both sides of the liquid crystal molecules when the liquid crystal modules are placed within an electric field, and accordingly an arrangement direction of the molecules changes according to the electric field. The optical anisotropy refers to changing a path or polarized state of emitted light according to an incident direction or polarized state of incident light based on a thin and long structure of the liquid crystal modules and the arrangement direction of the molecules.

Accordingly, the LCD device includes as an essential constituting element a liquid crystal panel formed by a pair of transparent insulating substrates, which face each other with the liquid crystal layer interposed therebetween and include electric field generating electrodes, respectively. The arrangement direction of the liquid crystal molecules is artificially adjusted by changing the electric field between the electric field generating electrodes and various images are displayed using transmittance of light which changes during the adjustment of the arrangement direction.

Here, polarizing plates are located on both upper and lower portions of the liquid crystal panel. The polarizing plates serve to decide a transmission degree of light according to disposition of transmission axes of the two polarizing plates and an arrangement characteristic of liquid crystals in a manner of allowing polarizing component light which is aligned with the transmission axes to transmit therethrough.

FIGS. 1A and 1B are exemplary views illustrating the characteristic of light transmitting through a liquid crystal panel.

As illustrated in FIGS. 1A and 1B, a typical LCD device includes a liquid crystal panel P and a backlight unit (not illustrated) provided at a rear surface of the liquid crystal panel P to supply light.

Here, the liquid crystal panel P includes first and second substrates 10 and 5 bonded to each other with a liquid crystal layer 30 interposed therebetween, and first and second polarizing plates 50a and 50b attached onto outer surfaces of the first and second substrates 10 and 5, respectively.

Although not illustrated, on an inner surface of the first substrate 10 are provided with a plurality of pixels each having a transparent pixel electrode, and thin film transistors (TFTs) each controlling an ON/OFF of a liquid crystal driving voltage transferred to each pixel electrode. On an inner surface of the second substrate 5 are provided with color filters for reproducing colors and common electrodes.

The liquid crystal layer 30 interposed between the first and second substrates 10 and 5 has a twisted nematic (TN) mode. Namely, when a voltage is not supplied, an alignment direction of liquid crystal molecules of the liquid crystal layer 30 is twisted by an azimuth angle of 90° from the first substrate 10 to the second substrate 5 while a major-axial direction of the molecules is in parallel to the first and second substrates 10 and 5. Here, polarization axes of the first and second polarizing plates 50a and 50b are orthogonal to each other.

The liquid crystal panel P does not emit light by itself and thus the backlight unit which supplies light to the liquid crystal panel P is located at the rear of the liquid crystal panel P.

With the configuration of the liquid crystal panel P, as illustrated in FIG. 1A, when a voltage is not supplied (Off state), the first polarizing plate 50a allows for transmission therethrough of only linearly-polarized light aligned in parallel to the polarization axis of the first polarizing plate 50a, of light emitted from the backlight unit, while absorbing the other light.

While transmitting through the liquid crystal layer 30, the linearly-polarized light is rotated by 90° according to the azimuth angle of the first polarizing plate 50a and thus transmits through the second polarizing plate 50b, thereby reproducing a white color.

Next, when a voltage is supplied (On state), the liquid crystal molecules of the liquid crystal panel P, as illustrated in FIG. 1B, are aligned in a manner that the major axis thereof is perpendicular to the first and second polarizing plates 50a and 50b. Therefore, optical rotary power of 90° vanishes, and linearly-polarized light transmitted through the first polarizing plate 50a is blocked by the second polarizing plate 50b, thereby reproducing a black color.

The second polarizing plate 50b includes an anti-glare layer (not illustrated) to prevent glare caused due to incident light entering from outside. Light incident onto the second polarizing plate 50b is diffused and scattered by diffused reflection due to the anti-glare layer.

The second polarizing plate 50b is further subject to a surface treatment through anti-reflection sputtering in order to reduce reflectance of incident light entering from outside. In other words, an anti-reflection layer is formed by alternately coating (stacking) two inorganic films having different refractive indexes on the anti-glare layer into five or six layers.

Here, the anti-reflection layer cannot be fabricated by wet coating due to roughness of a surface of the anti-glare layer, and rather fabricated by several times of sputtering as dry coating.

In this manner, the fabrication of the conventional polarizing plate brings about an increase in costs due to high-priced inorganic film materials and plural-time sputtering processes. Also, the polarizing plate has a magenta color in all directions due to the multi-layered structure.

SUMMARY

Accordingly, the present invention is directed to a polarizing plate, a liquid crystal display device having the same and a method of fabricating the polarizing plate that substantially obviate one or more of the problems due to limitations and disadvantages of the related art.

An object of the present invention is to provide a polarizing plate capable of preventing glare and reflection of external light, a liquid crystal display (LCD) device having the polarizing plate, and a method of fabricating the polarizing plate.

Another object of the present invention is to provide a polarizing plate having an anti-glare/reflection layer formed through a single coating process, an LCD device having the polarizing plate, and a method of fabricating the polarizing plate.

Additional features and advantages of the invention will be set forth in the description which follows, and in part will be apparent from the description, or may be learned by practice of the invention. The objectives and other advantages of the invention will be realized and attained by the structure particularly pointed out in the written description and claimes hereof as well as the appended drawings.

To achieve these and other advantages and in accordance with the purpose of this specification, as embodied and broadly described herein, a polarizing plate comprises a passivation layer on at least one surface of a base, and an anti-glare/reflection layer configured as a single layer on an outer surface of the passivation layer, the anti-glare/reflection layer may include polymer beads in a lower portion thereof, and air bubbles between a middle portion and a surface thereof.

In another aspect, a liquid crystal display device comprises a liquid crystal panel; and a polarizing plate onto at least one surface of the liquid crystal panel, wherein the polarizing plate comprises a passivation layer on at least one surface of a base, and an anti-glare/reflection layer configured as a single layer on an outer surface of the passivation layer, the anti-glare/reflection layer comprising polymer beads in a lower portion thereof, and air bubbles between a middle portion and a surface thereof.

In another aspect, a method comprises forming air bubbles in a nano size within a photocurable resin, scattering high refractive polymer beads into the resin with the air bubbles therein, forming a resin layer by coating the resin, in which the polymer beads and the air bubbles are mixed, onto a base film, and forming an anti-glare/reflection layer on the base film by curing the resin layer.

It is to be understood that both the foregoing general description and the following detailed description are exemplary and explanatory and are intended to provide further explanation of the invention.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE ILLUSTRATED EMBODIMENTS

Figure 1A:
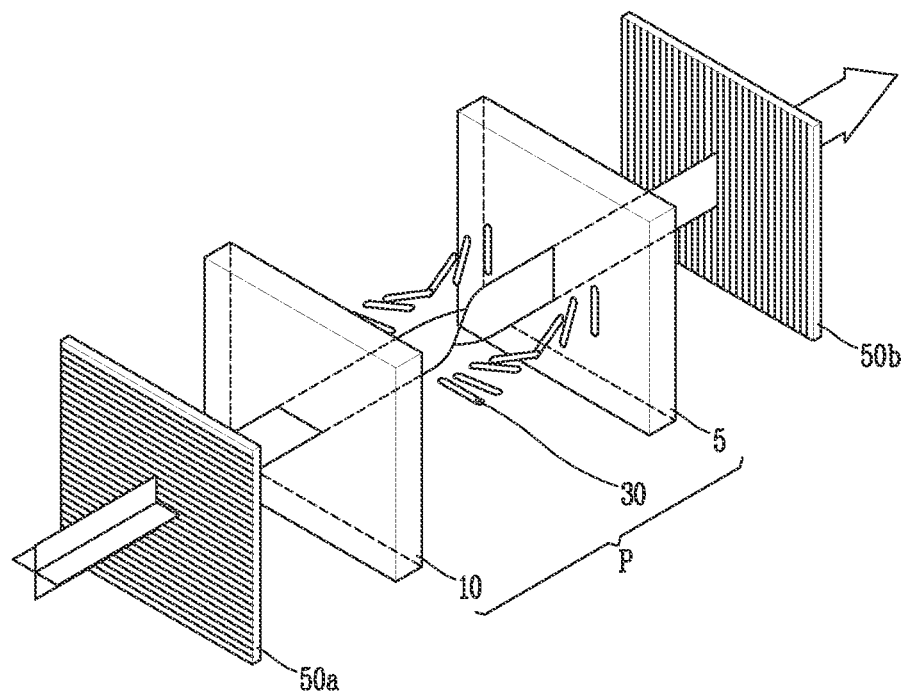
FIGS. 1A and 1B are exemplary views illustrating characteristic of light transmitted through a liquid crystal panel.
Figure 1B:
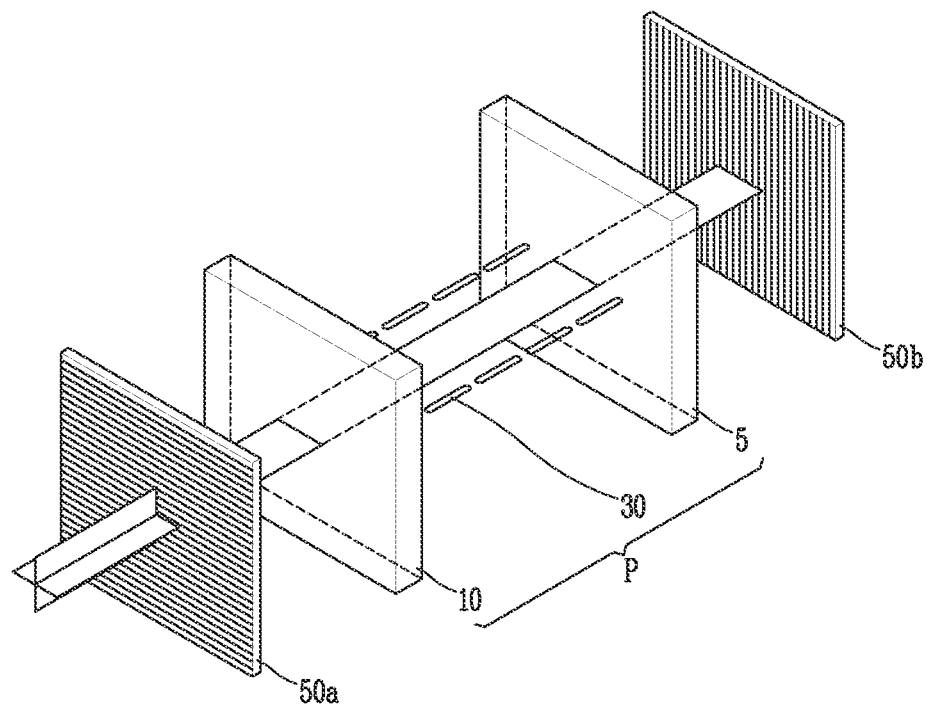

Description will now be given in detail of preferred embodiments of a polarizing plate, a liquid crystal display (LCD) device having the polarizing plate, and a method of fabricating the polarizing plate according to the present invention, with reference to the accompanying drawings, such that those skilled in the art to which the present invention belongs can easily practice.

Advantages and features of the present invention and methods of achieving those will be obviously understood with reference to the accompanying drawings and exemplary embodiments to be explained later in detail. Exemplary embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. The same/like reference symbols refer to the same/like components throughout the specification. In the drawings, the thicknesses of layers and regions are exaggerated for clarity.

It will be understood that when an element is referred to as being "on" another element, the element can be located on the other element or intervening elements may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Thus, the exemplary term "below" can encompass both an orientation of above and below.

The terminology used herein is for the purpose of describing particular embodiments only and is not intended to be limiting of example embodiments. As used herein, the singular forms are intended to include the plural forms as well, unless the context clearly indicates otherwise. It will be further understood that the terms "comprises", "comprising", "includes" and/or "including," if used herein, specify the presence of stated steps, operations, elements and/or components, but do not preclude the presence or addition of one or more other features, integers, steps, operations, elements, components and/or groups thereof.

Figure 2:
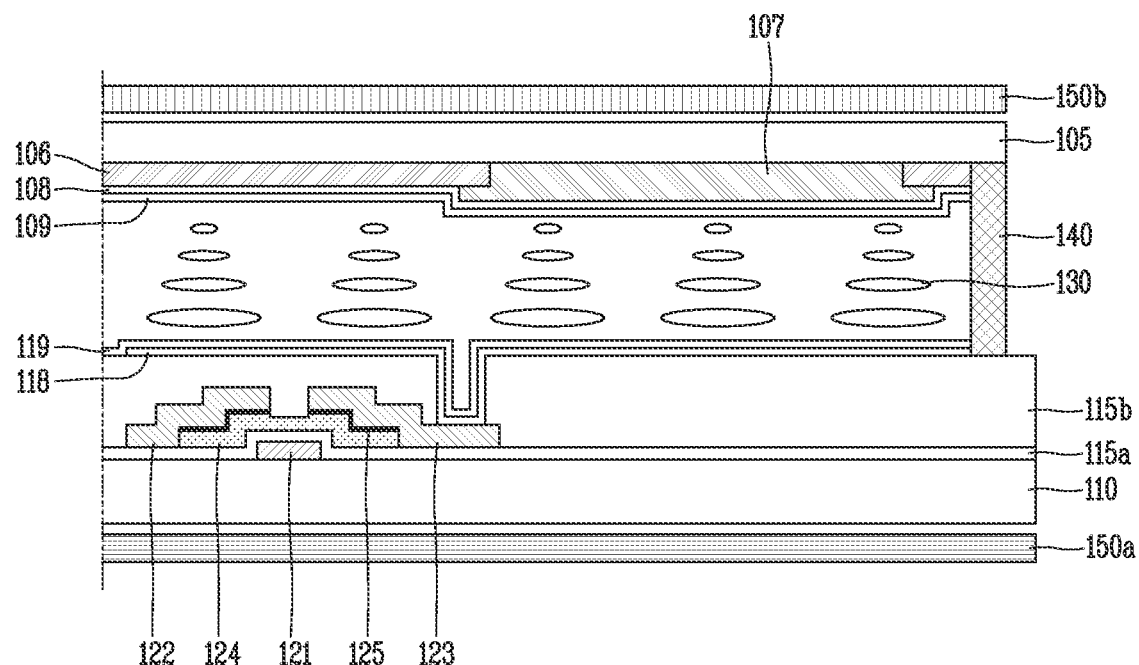
FIG. 2 is a sectional view schematically illustrating a partial structure of a liquid crystal panel in accordance with a first exemplary embodiment of the present invention.

FIG. 2 is a sectional view schematically illustrating a partial structure of a liquid crystal panel in accordance with a first exemplary embodiment of the present invention.

A liquid crystal panel according to a first exemplary embodiment illustrated in FIG. 2 is a TN mode liquid crystal panel, but the present invention may not be limited to this. The present invention may also be applicable to any of liquid crystal modes, such as an in-plane switching (IPS) mode, a fringe field switching (FFS) mode, and a vertical alignment (VA) mode.

With reference to FIG. 2, the liquid crystal panel according to the first exemplary embodiment roughly includes a color filter substrate 105 and an array substrate 110, and a liquid crystal panel 130 interposed between the color filter substrate 105 and the array substrate 110 while maintaining a cell-gap by use of column spacers (not illustrated).

The color filter substrate 105 includes a color filter 107 having a plurality of sub color filters for reproducing red (R), green (G) and blue (B) colors, a black matrix 106 partitioning the sub color filters and blocking light transmitting the liquid crystal layer 130, and a transparent common electrode 108 applying a voltage to the liquid crystal layer 130.

The array substrate 110 includes a plurality of gate lines (not illustrated) and data lines (not illustrated) that are arranged vertically and horizontally to define a plurality of pixel regions, thin film transistor (TFTs) as switching elements each formed at an intersecting region between the gate line and the data line, and pixel electrodes 118 provided on the pixel regions, respectively.

The TFT includes a gate electrode 121 connected to the gate line, a source electrode 122 connected to the data line, and a drain electrode 123 electrically connected to the pixel electrode 118 through a contact hole formed through a passivation layer 115b. The TFT also includes a gate insulating layer 115a for insulating between the gate electrode 121 and the source and drain electrodes 122 and 123, and an active layer 124 forming a conductive channel between the source electrode 122 and the drain electrode 123 by a gate voltage supplied to the gate electrode 121.

Here, when an amorphous silicon thin film is used as the active layer 124, a source/drain region of the active layer 124 forms an Ohmic-contact with the source and drain electrodes 122 and 123 through an Ohmic-contact layer 125.

However, the present invention may not be limited to this. The active layer 124 may also be formed of a poly crystal silicon thin film or another semiconductor material, such as oxide semiconductor or the like.

The thusly-configured color filter substrate 105 and the array substrate 110 are bonded to each other in a facing manner, by use of a sealant 140 which is provided along an outer edge of an image display region, thereby configuring the liquid crystal panel. Here, the bonding between the color filter substrate 105 and the array substrate 110 are achieved by a bonding key (not illustrated) which is formed on the color filter substrate 105 or the array substrate 110.

The liquid crystal panel is provided with a backlight unit at the rear surface thereof for light supply. This results from the requirement for a separate light source because the LCD device is a device without a light-emitting element.

The light source may be implemented by using one of a fluorescent lamp, such as a cold cathode fluorescent lamp (CCFL), an external electrode fluorescent lamp (EEFL) or a hot cold fluorescent lamp (HCFL), or a light emitting diode (LED).

However, the present invention may not be limited to the LCD device described above, but be applicable to any type of device which requires for prevention of glare/reflection. For example, the present invention can be applied to a plasma display panel (PDP), an organic electro luminescence display (OLED) and the like, as well as the conventional CRT.

Here, an upper polarizing plate 150b and a lower polarizing plate 150a are attached onto outer surfaces of the color filter substrate 105 and the array substrate 110, respectively, for selective transmission of only specific polarized light.

The polarizing plates 150a and 150b play a role of generating light vibrating in one specific direction, in a manner of transmitting only light vibrating in the same direction as a polarization axis thereof, of light emitted from the backlight unit, and absorbing or reflecting the other light vibrating in the other directions by using an appropriate medium.

An upper alignment layer 109 and a lower alignment layer 119 which are rubbed in a predetermined direction are interposed between the liquid crystal layer 130 and the common electrode 108 and between the liquid crystal layer 130 and the pixel electrode 118, respectively. The upper alignment layer 109 and the lower alignment layer 119 serve to uniformly maintain an initially arranged state and aligned direction of liquid crystals.

Accordingly, a polarized state of linearly-polarized light which has transmitted through the lower polarizing plate 150a is changed due to anisotropy of the liquid crystals, such that the linearly-polarized light can transmit through the upper polarizing plate 150b. The liquid crystal layer 130 reproduces grayscale according to voltage strength.

Here, according to the present invention, an anti-glare/reflection layer which is configured in the form of a single layer is provided on the upper polarizing plate 150b through one coating process, which will be described in detail with reference to the drawings.

Figure 3:
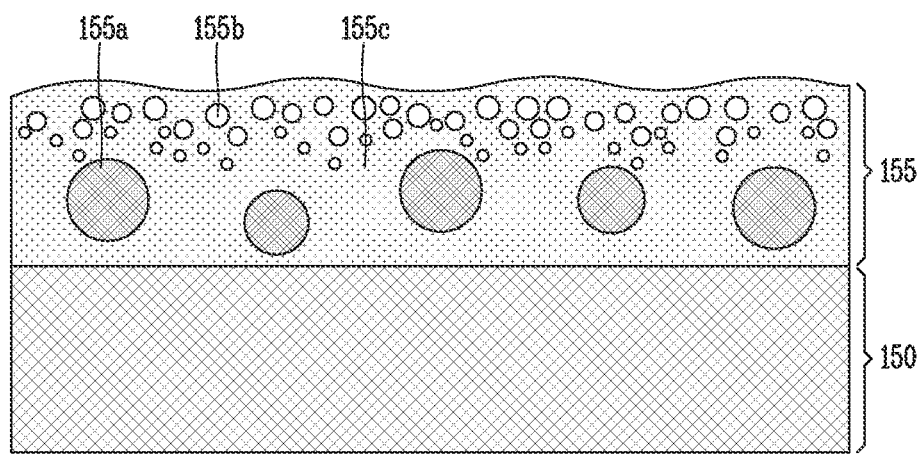
FIG. 3 is a sectional view schematically illustrating a structure of a polarizing plate in accordance with a first exemplary embodiment of the present invention.

FIG. 3 is a sectional view schematically illustrating a structure of a polarizing plate in accordance with a first exemplary embodiment of the present invention.

Figure 4A:
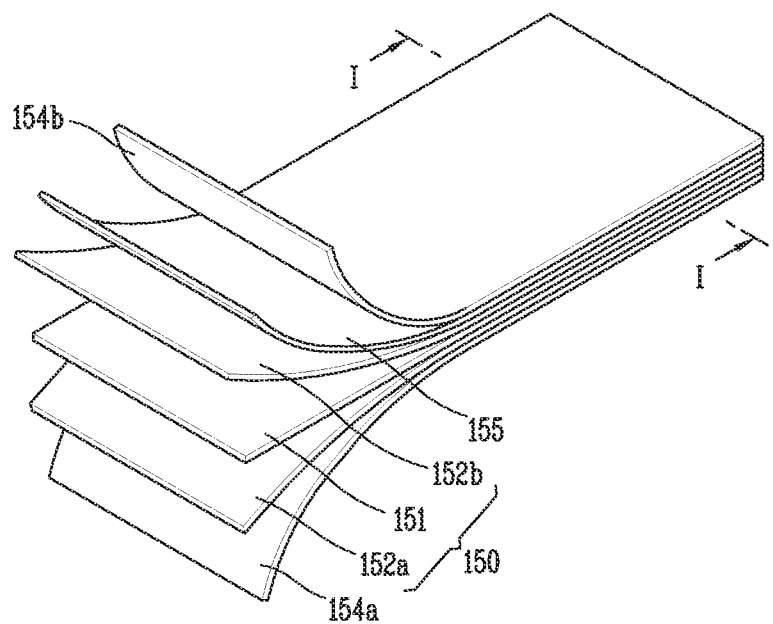
FIGS. 4A and 4B are an exploded perspective view and a sectional view, respectively, illustrating components of the polarizing plate in accordance with the first exemplary embodiment illustrated in FIG. 3.
Figure 4B:
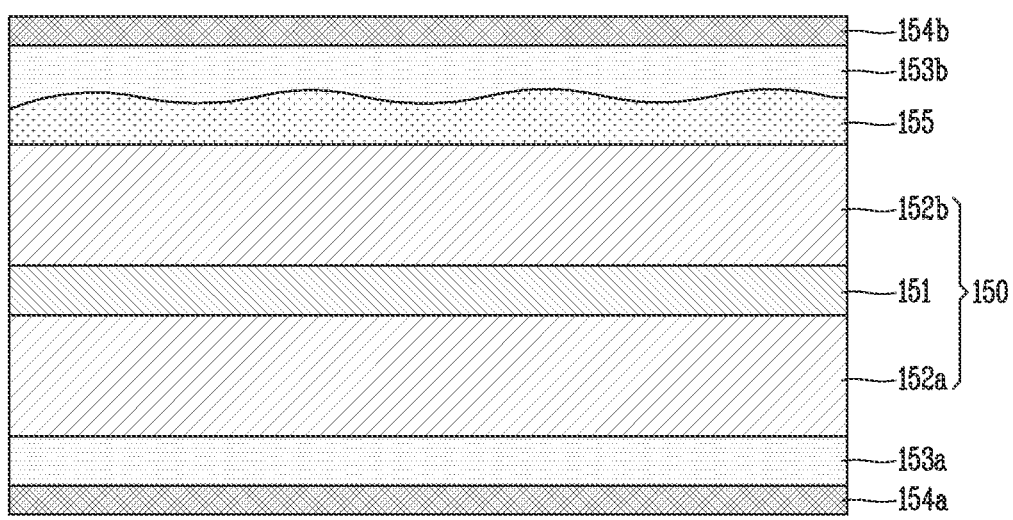

And, FIGS. 4A and 4B are an exploded perspective view and a sectional view, respectively, illustrating components of the polarizing plate in accordance with the first exemplary embodiment illustrated in FIG. 3.

Here, for the sake of brief explanation, FIG. 4A schematically illustrates components of a polarizing plate in a state that an adhesive is omitted.

Also, FIG. 4B is a sectional view, taken along the line 'I-I', schematically illustrating the components of the polarizing plate according to the first exemplary embodiment illustrated in FIG. 4A.

As illustrated in those drawings, a polarizing plate 150 according to a first exemplary embodiment of the present invention may include a base 151, and passivation layers 152a and 152b located on both surfaces of the base 151.

The polarizing plate 150 is a polarization element which obtains polarized light in a manner of transmitting only light having a vibration plane in a predetermined direction, of natural light having vibration planes in all directions, and absorbing the other light.

An element which divides light into a polarizing component perpendicular to an incident plane and a polarizing component in parallel to the incident plane by using a polarizer having a light absorption characteristic. Linearly-polarized light and elliptically-polarized light are obtained by the polarizer.

To this end, an appropriate material may be selected and processed into a film shape to be suitable for usage, so as to have uniform polarization property and high polarization efficiency.

For example, an iodine-treated polyvinyl alcohol (PVA) film is used as the polarization base 151. And, a triacetate cellulose (TAC) film, which has high transparency, ultraviolet absorption and durability as well as stability for measurement or deformation and abrasion resistance, may be used as the passivation layers 152a and 152b which protect the PVA film.

To protect the base 151 and the passivation layers 152a and 152b which are attached to each other, a protection film 154a and a release film 154b may further be attached.

Here, the protection film 154a is attached onto an outer surface of the first passivation layer 152a to prevent scratches from being generated on a surface of the polarizing plate 150 until the polarizing plate 150 is attached to a final product. The release film 154b may be attached onto an outer surface of the second passivation layer 152b until the polarizing plate 150 is attached to a final product.

The release film 154b and the second passivation film 152b are adhered to each other by an adhesive 153b. A surface of the polarizer 150, from which the release film 154b is removed, is attached onto the final product. On the other hand, it may be unnecessary to provide the adhesive 153a on the first passivation layer 152a with the protection film 154a attached thereto.

The thusly-configured polarizing plate 150, more specifically, a surface of the polarizing plate 150 from which the release film 154b is removed is attached onto each of upper and lower surfaces of the liquid crystal panel.

Here, a reinforcing plate for protecting the liquid crystal panel from an external impact may further be provided on the upper polarizing plate 150 attached to the upper surface of the liquid crystal panel.

In this instance, the reinforcing plate may be formed of, for example, tempered glass which is about 3 mm thick so as to protect the inner liquid crystal panel from an external impact. The tempered glass is a type of glass which is tempered by heating molding plate glass at temperature of 500 to 600° C. close to softening temperature, and quickly cooling the heated molding plate glass using compressed cooling air so as to compress a surface of the glass and elongate an inside of the glass by tensile force. The tempered glass has bending strength stronger by 3 to 5 times than that of typical glass, and impact resistance stronger by 3 to 8 times than that of the typical glass, and also exhibits superior heat resistance.

An anti-glare/reflection layer 155 according to the present invention is provided on an outer surface of the polarizing plate 150 having the configuration, namely, an outer surface of the second passivation layer 152b of the polarizing plate 150 from which the release film 154b is removed.

The anti-glare/reflection layer 155 may be formed into a single layer through one coating process by using phase separation, which results from a weight difference between polymer beads 155a and air bubbles 155b.

The anti-glare/reflection layer 155 may be formed of photocurable resin, for example, an acryl-based resin 155c. The anti-glare/reflection layer 155 contains polymer beads 155a therein. The polymer beads 155a have a spherical shape and are located in a lower portion of the anti-glare/reflection layer 155.

The anti-glare/reflection layer 155 forms inner or outer haze due to the high refractive polymer beads 155a contained therein.

The surface of the anti-glare/reflection layer 155 has a concave-convex shape by the spherical polymer beads 155a and the air bubbles 155b. Accordingly, incident light entering from outside is subject to diffused reflection by being diffused and scattered due to the anti-glare/reflection layer 155.

Here, the acryl-based resin 155c constructing the anti-glare/reflection layer 155 plays a role of a binder which holds (supports) the polymer beads 155a. Here, the acryl-based resin 155c may be formed of polyester resin, polyether resin, acryl resin, epoxy resin, urethane resin and the like.

The refractive index of the acryl-based resin 155c is preferably in the range of about 1.4 to 1.5.

The polymer bead 155a may be formed of any polymer having a refractive index in the range of about 1.55 to 1.8.

Here, the polymer beads 155a may be replaced with silica minute particles.

The polymer beads 155a or the silica minute particles may have diameters in the range of about 3 μm to 6 μm. However, the present invention may not be limited to this.

The air bubbles 155b may be located between a middle portion and a surface of the anti-glare/reflection layer 155, due to the phase separation. Here, the air bubbles 155b may be arranged in a manner that density of the air bubbles 155b can gradually increase from the middle portion toward the surface.

Also, the air bubbles 155b may be arranged in a manner that diameters thereof can gradually increase from the middle portion toward the surface of the anti-glare/reflection layer 155 due to the phase separation.

When the air bubbles 155b are arranged in such a manner, a relative reflective index of the anti-glare/reflection layer 155 is gradually lowered from the middle portion toward the surface, so as to be similar to a refractive index of an air layer. This can result in an effective reduction of reflectance.

Figure 5:
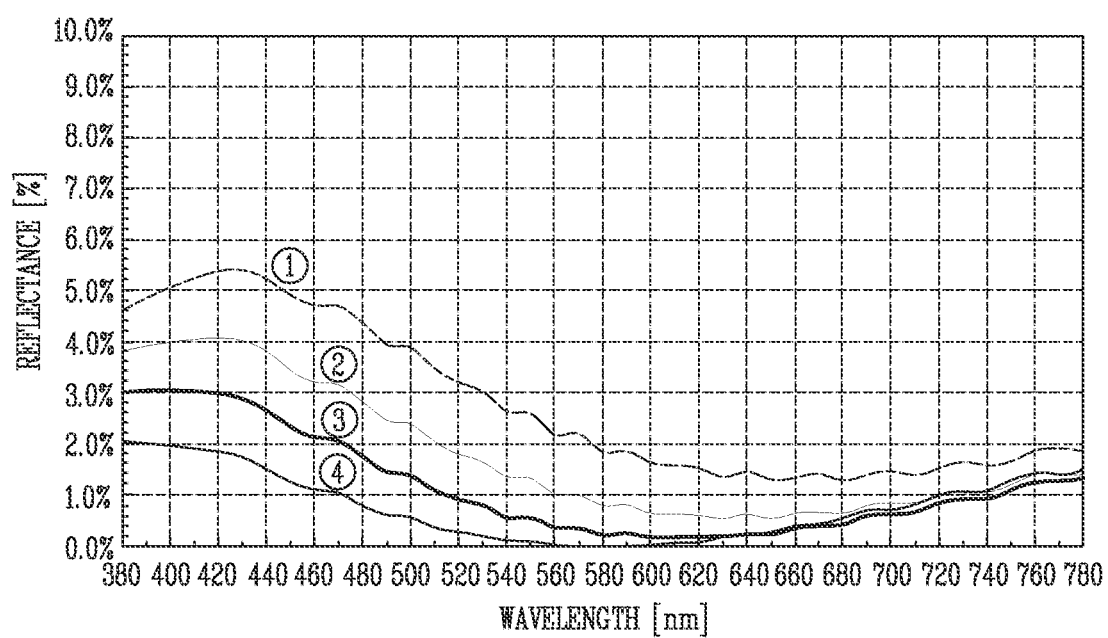
FIG. 5 is a graph illustrating comparison results of reflectivities with respect to wavelengths according to a relative refractive index of a surface of an anti-glare/reflection layer.

FIG. 5 is a graph illustrating comparison results of reflectivities with respect to wavelengths according to a relative refractive index of a surface of an anti-glare/reflection layer.

Here, FIG. 5 illustrates comparison results of reflectivities with respect to wavelengths according to a relative refractive index $n_1$ of the surface of the anti-glare/reflection layer with respect to the air layer ($n_o$=1.00).

The illustrated graphs ①, ②, ③ and ④ show that the relative refractive index $n_1$ of the surface of the anti-glare/reflection layer is 1.460, 1.400, 1.350 and 1.290, respectively.

With reference to FIG. 5, it can be noticed that the relative refractive index of the surface of the anti-glare/reflection layer is lowered due to the density of the air bubbles, and the reflectivities with respect to the wavelengths are generally reduced when the relative refractive index is lowered.

That is, the refractive index of the surface of the anti-glare/reflection layer becomes equal to that of the air layer when being closer to the surface starting from the middle portion of the anti-glare/reflection layer. Also, as the air bubble density of the surface of the anti-glare/reflection layer increases, the reflectance is reduced due to a reduction of interfacial reflection.

However, the present invention may not be limited to the arrangement. The air bubbles according to the present invention may be randomly arranged within the anti-glare/reflection layer, which will now be described in detail based on a second exemplary embodiment of the present invention.

Figure 6:
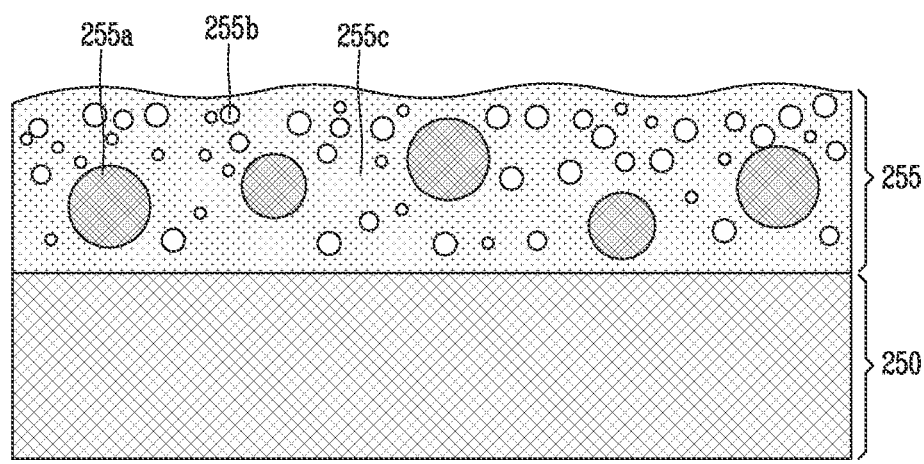
FIG. 6 is a sectional view schematically illustrating a structure of a polarizing plate in accordance with a second exemplary embodiment of the present invention.

FIG. 6 is a sectional view schematically illustrating a structure of a polarizing plate in accordance with a second exemplary embodiment of the present invention.

Here, a polarizing plate according to a second exemplary embodiment of the present invention illustrated in FIG. 6 has substantially the same configuration as the polarizing plate according to the aforementioned first exemplary embodiment, except for a random arrangement of air bubbles.

Although not illustrated in detail, the polarizing plate 250 according to the second exemplary embodiment may include a base and passivation layers provided on both surfaces of the base.

A protection film and a release film may further be attached for protecting the base and the passivation layers which are adhered with each other.

Here, as aforementioned, the protection film may be attached onto an outer surface of the first passivation layer to prevent scratches from being generated on a surface of the polarizing plate 250 until the polarizing plate 250 is attached to a final product. The release film may be attached onto an outer surface of the second passivation layer until the polarizing plate 250 is attached to a final product.

The release film and the second passivation film are adhered to each other by an adhesive. On the other hand, it may be unnecessary to provide the adhesive on the first passivation layer with the protection film attached thereto.

The thusly-configured polarizing plate 250, namely, a surface of the polarizing plate from which the release film is removed is attached onto each of upper and lower surfaces of the liquid crystal panel.

An anti-glare/reflection layer 255 according to the present invention is attached onto an outer surface of the polarizing plate 250, namely, an outer surface of the second passivation layer of the polarizing plate 250, from which the release film is removed.

The anti-glare/reflection layer 255 may be formed into a single layer through one coating process by using phase separation, which results from a weight difference between polymer beads 255a and air bubbles 255b.

The anti-glare/reflection layer 255 may be formed of photocurable resin, for example, an acryl-based resin 255c. The anti-glare/reflection layer 255 contains polymer beads 255a therein. The polymer beads 255a have a spherical shape and are located in a lower portion of the anti-glare/reflection layer 255.

The anti-glare/reflection layer 255 forms inner and outer haze due to the high refractive polymer beads 255a contained therein.

The surface of the anti-glare/reflection layer 255 has a concave-convex shape due to the spherical polymer beads 255a and the air bubbles 255b. Accordingly, incident light entering from outside is subject to diffused reflection by being diffused and scattered due to the anti-glare/reflection layer 255.

Here, the acryl-based resin 255c constructing the anti-glare/reflection layer 255 plays a role of a binder which holds (supports) the polymer beads 255a, here, the acryl-based resin 255c may be formed of polyester resin, polyether resin, acryl resin, epoxy resin, urethane resin and the like.

The refractive index of the acryl-based resin 255c is preferably in the range of about 1.4 to 1.5.

The polymer bead 255a may be formed of any polymer having a refractive index in the range of about 1.55 to 1.8.

Here, the polymer beads 255a may be replaced with silica minute particles.

The polymer beads 255a or the silica minute particles may have diameters in the range of about 3 μm to 6 μm. However, the present invention may not be limited to this.

The air bubbles 255b may be positioned between a middle portion and a surface of the anti-glare/reflection layer 255, due to the phase separation. Here, in accordance with the second exemplary embodiment, the air bubbles 255b may be arranged randomly in the anti-glare/reflection layer 255.

That is, the air bubbles 255b may be randomly arranged within the anti-glare/reflection layer 255 from the middle portion up to the surface, irrespective of density and diameters thereof.

Meanwhile, an anti-glare/reflection layer according to the present invention may also be applied to a structure without polymer beads, which will now be described in detail with reference to a third exemplary embodiment of the present invention.

Figure 7:
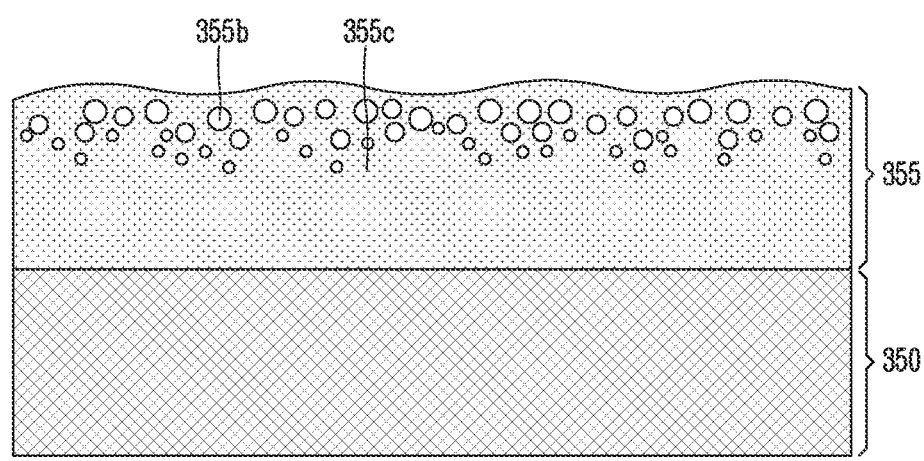
FIG. 7 is a sectional view schematically illustrating a structure of a polarizing plate in accordance with a third exemplary embodiment of the present invention.

FIG. 7 is a sectional view schematically illustrating a structure of a polarizing plate in accordance with a third exemplary embodiment of the present invention.

Here, a polarizing plate according to a second exemplary embodiment of the present invention illustrated in FIG. 7 has substantially the same configuration as the polarizing plate according to the aforementioned first exemplary embodiment, except for non-presence of polymer beads within an anti-glare/reflection layer.

Although not illustrated in detail, the polarizing plate 350 according to the third exemplary embodiment may include a base and passivation layers provided on both surfaces of the base.

A protection film and a release film may further be attached for protecting the base and the passivation layers which are adhered with each other.

Here, as aforementioned, the protection film may be attached onto an outer surface of the first passivation layer to prevent scratches from being generated on a surface of the polarizing plate 350 until the polarizing plate 350 is attached to a final product. The release film may be attached onto an outer surface of the second passivation layer until the polarizing plate 350 is attached to a final product.

The release film and the second passivation film are adhered to each other by an adhesive. On the other hand, it may be unnecessary to provide the adhesive on the first passivation layer with the protection film attached thereto.

The thusly-configured polarizing plate 350, more specifically, a surface of the polarizing plate 350 from which the release film is removed is attached onto each of upper and lower surfaces of the liquid crystal panel.

An anti-glare/reflection layer 355 according to the present invention is attached onto an outer surface of the polarizing plate 350, namely, an outer surface of the second passivation layer of the polarizing plate 350, from which the release film is removed.

The anti-glare/reflection layer 355 may contain the air bubbles 355b arranged in a manner that density and diameters of the air bubbles 355b gradually increase from the middle portion toward the surface of the anti-glare/reflection layer 355, due to the phase separation resulting from a weight difference of the air bubbles 355b.

The anti-glare/reflection layer 355 may be formed of photocurable resin, for example, an acryl-based resin 355c. The anti-glare/reflection layer 355 may contain spherical air bubbles 355b therein.

The surface of the anti-glare/reflection layer 355 has a concave-convex shape due to the spherical air bubbles 355b. Accordingly, incident light entering from outside is subject to diffused reflection by being diffused and scattered due to the anti-glare/reflection layer 355.

Here, the acryl-based resin 355c constructing the anti-glare/reflection layer 355 may be formed of polyester resin, polyether resin, acryl resin, epoxy resin, urethane resin and the like.

The refractive index of the acryl-based resin 355c is preferably in the range of about 1.4 to 1.5.

As aforementioned, the air bubbles 355b may be positioned between the middle portion and the surface of the anti-glare/reflection layer 355, due to the phase separation. Here, the density of the air bubbles 355b may gradually increase from the middle portion toward the surface.

Also, the air bubbles 355b may be configured in a manner that diameters thereof gradually increase from the middle portion toward the surface of the anti-glare/reflection layer 355 due to the phase separation.

When the air bubbles 355b are arranged in such a manner, a relative reflective index of the anti-glare/reflection layer 355 is gradually lowered from the middle portion toward the surface. This can result in an effective reduction of reflectance.

Figure 8A:
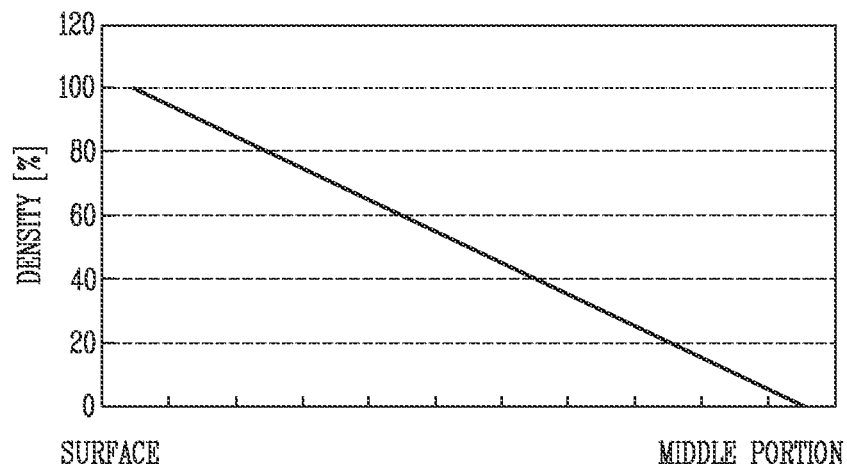
FIGS. 8A to 8C are views illustrating an example of adjusting density of air bubbles within an anti-glare/reflection layer.
Figure 8B:
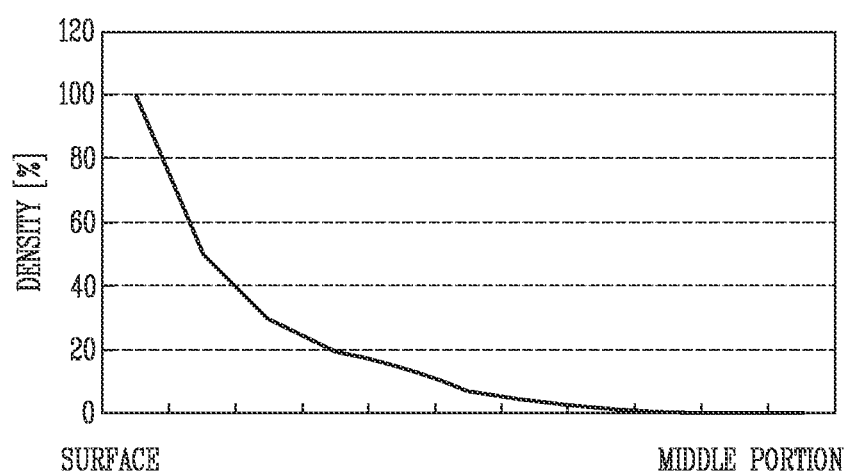
Figure 8C:
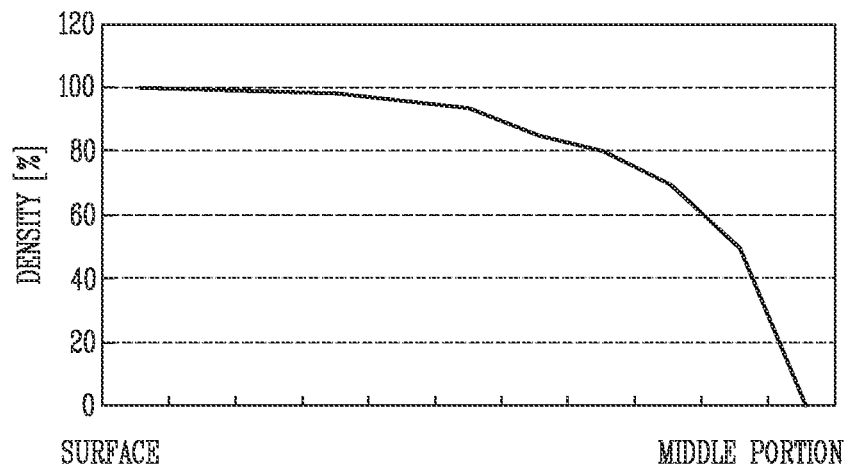

FIGS. 8A to 8C are views illustrating an example of adjusting density of air bubbles within an anti-glare/reflection layer.

Here, FIGS. 8A to 8C exemplarily illustrate a rate of air bubbles within a resin in a range from a middle portion to a surface of an anti-glare/reflection layer.

The air bubbles may be positioned between the middle portion and the surface of the anti-glare/reflection layer, due to phase separation. Here, the air bubbles may be arranged in a manner that the density thereof linearly increases from the middle portion toward the surface (see FIG. 8A).

Or, the air bubbles may be arranged in a manner that the density thereof increases according to a logarithmic function from the middle portion toward the surface of the anti-glare/reflection layer (see FIG. 8B).

However, the present invention may not be limited to this. The air bubbles may also be arranged in a manner that the density thereof increases according to an exponential function from the middle portion toward the surface of the anti-glare/reflection layer (see FIG. 8C).

Hereinafter, description will be given in detail of a method of fabricating a polarizing plate having such configuration with reference to the accompanying drawings.

FIGS. 9A to 9D are sectional views sequentially illustrating a fabricating process of a polarizing plate in accordance with the present invention.

Figure 9A:
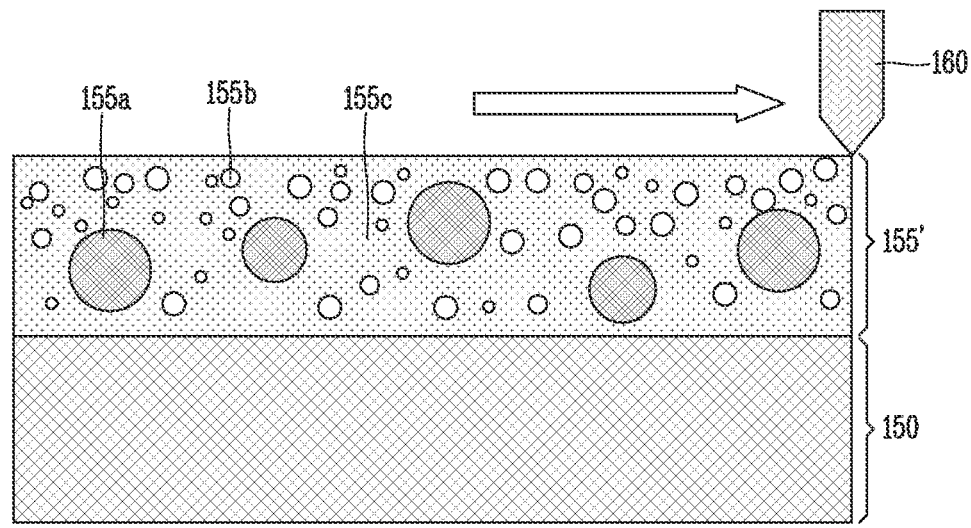
FIGS. 9A to 9D are sectional views sequentially illustrating a fabricating process of a polarizing plate in accordance with the present invention.

First, as illustrated in FIG. 9A, nano-sized air bubbles 155b are fabricated within a photocurable resin, for example, an acryl-based resin 155c.

The acryl-based resin 155c may be formed of polyester resin, polyether resin, acryl resin, epoxy resin, urethane resin and the like.

For example, a photocurable acrylate resin which has viscosity of 10 to 100 mPa*S at temperature of about 25° C.

Here, urethanacrylate or (meta)acrylate polymer may be contained.

The refractive index of the acryl-based resin 155c is preferably in the range of about 1.4 to 1.5.

And, the air bubbles 155b may be generated using an impeller at temperature of about 25 to 70° C. and rotation speed of 2500 to 25000 rpm for 24 hours. In this instance, a size of the air bubble 155b may be in proportion to the rotation speed (rpm). That is, external air may be sucked into a solution using high rotation force of the impeller, sliced into small particles, thereby forming nano-sized air bubbles 155b.

The nano-sized air bubbles 155b may be as small as possible, and be as small as at least 300 nm or less, preferably, 70 nm or less.

Afterwards, to prevent glare by forming inner haze, high refractive polymer beads 155a, whose weight is relatively greater than that of the acrylate resin, are scattered into the acrylate resin 155c.

Here, the polymer beads 155a may have a refractive index in the range of 1.55 to 1.8 to help generating the inner haze through light diffusion, and be formed of polystyrene-acrylate beads.

Here, the polymer beads 155a may be replaced with silica minute particles.

The content of the polymer bead 155a may be 10 to 50 percent by weight with respect to 100 percent by weight of resin, and beads having sizes in the range of 3 μm to 6 μm can be used.

The polymer bead 155a may be designed to have different size and content according to haze desiring to generate.

The acryl-based resin 155c mixed with the polymer beads 155a and the air bubbles 155b is coated (deposited) on a base film such as the polarizing plate 150 by a thickness of 5 μm to 10 μm, thereby forming a predetermined resin layer 155'.

For reference, the reference numeral 160 denotes a coating device used for coating the acryl-based resin 155c. Here, the present invention can apply wet coating, which contributes to more reduction of fabricating costs than the conventional sputtering process.

Figure 9B:
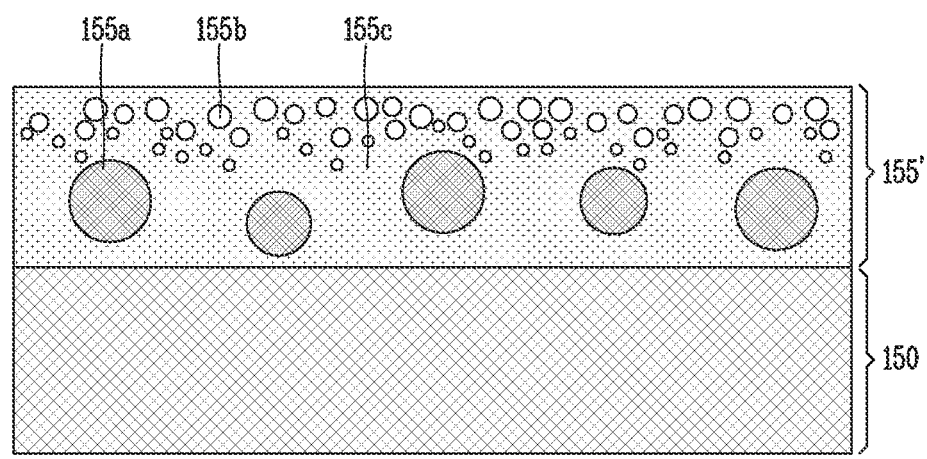

Afterwards, as illustrated in FIG. 9B, due to the phase separation resulting from a weight difference, the relatively small air bubbles 155b are located in an upper portion of the acryl-based resin 155c and the relatively great polymer beads 155a are located in a lower portion of the acryl-based resin 155c according to the lapse of time.

Figure 9C:
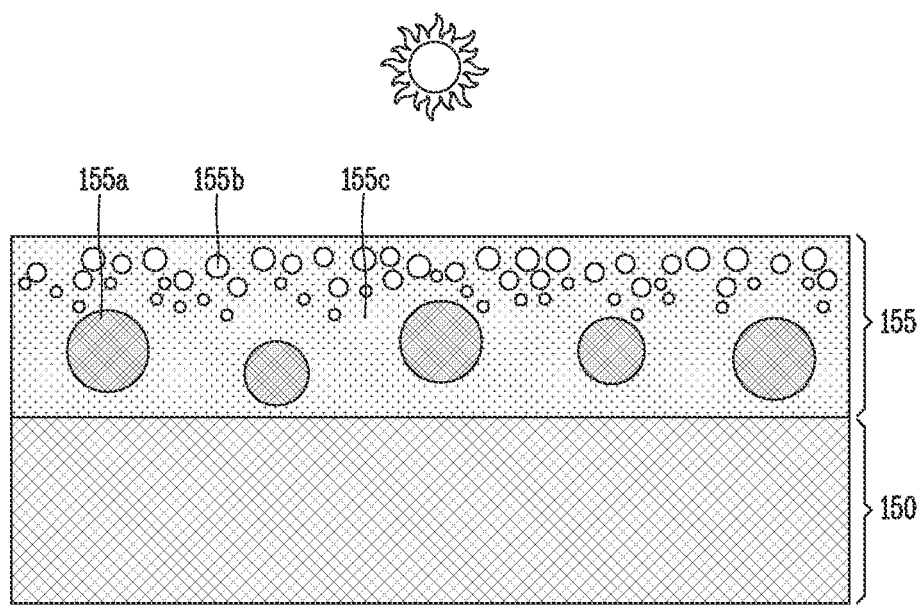
Figure 9D:
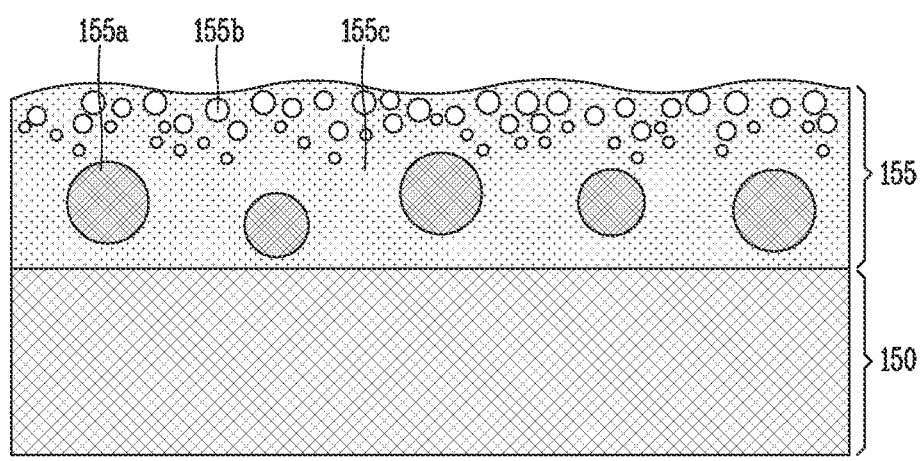

Then, as illustrated in FIGS. 9C and 9D, the acryl-based resin 155c is dried at temperature of about 25 to 70° C., and then cured by irradiating UV, thereby forming an anti-glare/reflection layer 155.

Here, as aforementioned, the polymer beads 155a may have the spherical shape and be located in the lower portion of the anti-glare/reflection layer 155.

The high refractive polymer beads 155a within the anti-glare/reflection layer 155 may allow for generation of inner or outer haze.

The air bubbles 155b may be located between a surface and a middle portion of the anti-glare/reflection layer 155 according to the phase separation, and arranged in a manner that the density thereof can gradually decrease from the surface toward the middle portion of the anti-glare/reflection layer 155. This may result in a reduction of reflectance.

Also, the air bubbles 155b may be arranged in a manner that the diameters thereof can gradually decrease from the surface toward the middle portion of the anti-glare/reflection layer 155 according to the phase separation.

When the air bubbles 155b are arranged in such a manner, a relative reflective index of the anti-glare/reflection layer 155 is gradually lowered from the middle portion toward the surface. This can result in an effective reduction of reflectance.

As such, the present invention can provide an effect of ensuring cost competitiveness by forming the anti-glare/reflection layer 155, which is formed into a single layer through one coating process using the phase separation resulting from a weight difference between the polymer beads 155a and the air bubbles 155b.

The configurations and methods of the mobile terminal in the aforesaid embodiments may not be limitedly applied, but such embodiments may be configured by a selective combination of all or part of the embodiments so as to implement many variations.

As described above, according to a polarizing plate, a liquid crystal display device having the polarizing plate and a method of fabricating the polarizing plate disclosed herein, an anti-glare/reflection layer may be formed into a single layer through one coating process using a phase separation resulting from a weight difference between polymer beads and air bubbles, which may result in ensuring cost competitiveness.

It will be apparent to those skilled in the art that various modifications and variations can be made in the invention without departing from the spirit or scope of the invention. Thus, it is intended that the present invention cover the modifications and variations of this invention provided they come within the scope of the appended claims and their equivalents.

What is claimed is:

1. A polarizing plate, comprising:
a passivation layer on at least one surface of a base; and
an anti-glare/reflection layer configured as a single layer on an outer surface of the passivation layer, the anti-glare/reflection layer comprising polymer beads in a lower portion thereof, and air bubbles between a middle portion and a surface thereof,
wherein the polymer beads and air bubbles are formed separately, and the air bubbles are formed on the polymer beads.

2. The polarizing plate of claim 1, wherein the anti-glare/reflection layer comprises the polymer beads and the air bubbles within a photocurable resin.

3. The polarizing plate of claim 1, wherein the polymer beads and the air bubbles have spherical shapes, and the surface of the anti-glare/reflection layer has a concave-convex shape.

4. The polarizing plate of claim 1, wherein the polymer bead is made of polymer having a refractive index in the range of 1.55 to 1.8.

5. The polarizing plate of claim 1, wherein the polymer bead has a diameter in the range of 3 μm to 6 μm, and the air bubble has a diameter in the range of 1 nm to 300 nm.

6. The polarizing plate of claim 1, wherein the air bubbles are arranged in a manner that density thereof gradually increases from the middle portion toward the surface.

7. The polarizing plate of claim 1, wherein the air bubbles are arranged in a manner that diameters thereof gradually increase from the middle portion toward the surface.

8. A liquid crystal display device, comprising:
a liquid crystal panel; and
a polarizing plate on at least one surface of the liquid crystal panel, wherein the polarizing plate comprises a passivation layer on at least one surface of a base, and an anti-glare/reflection layer configured as a single layer on an outer surface of the passivation layer, the anti-glare/reflection layer comprising polymer beads in a lower portion thereof, and air bubbles between a middle portion and a surface thereof,
wherein the polymer beads and air bubbles are formed separately, and the air bubbles are formed on the polymer beads.

9. The liquid crystal display device of claim 8, the anti-glare/reflection layer comprises the polymer beads and the air bubbles within a photocurable resin.

10. The liquid crystal display device of claim 8, wherein the air bubbles are arranged in a manner that density thereof gradually increases from the middle portion toward the surface.

11. The liquid crystal display device of claim 8, wherein the air bubbles are arranged in a manner that diameters thereof gradually increase from the middle portion toward the surface.

12. A liquid crystal display device, comprising:
a liquid crystal panel;
a polarizing plate on the liquid crystal panel; and
an anti-glare/reflection layer on the polarizing plate configured as a single layer, wherein the anti-glare/reflection layer includes polymer beads and air bubbles,
wherein the polymer beads and air bubbles are formed separately, and the air bubbles are formed on the polymer beads, and
wherein a density of the air bubbles configured to increase from a middle portion of the anti-glare/reflection layer to an upper portion of the anti-glare/reflection layer.

13. The liquid crystal display device of claim 12, wherein diameters of the air bubbles are configured to increase from the middle portion of the anti-glare/reflection layer to the upper portion of the anti-glare/reflection layer.

14. The liquid crystal display device of claim 12, wherein the air bubbles are configured to locate between the middle portion of the anti-glare/reflection layer and the upper portion of the anti-glare/reflection layer.

15. The liquid crystal display device of claim 12, wherein the polymer beads are configured to locate between the middle portion of the anti-glare/reflection layer and a lower portion of the anti-glare/reflection layer.

* * * * *